Jan. 22, 1952   B. J. AUBURN ET AL   2,583,078
TENSION RESPONSIVE CONTROL SYSTEM
Filed April 13, 1948
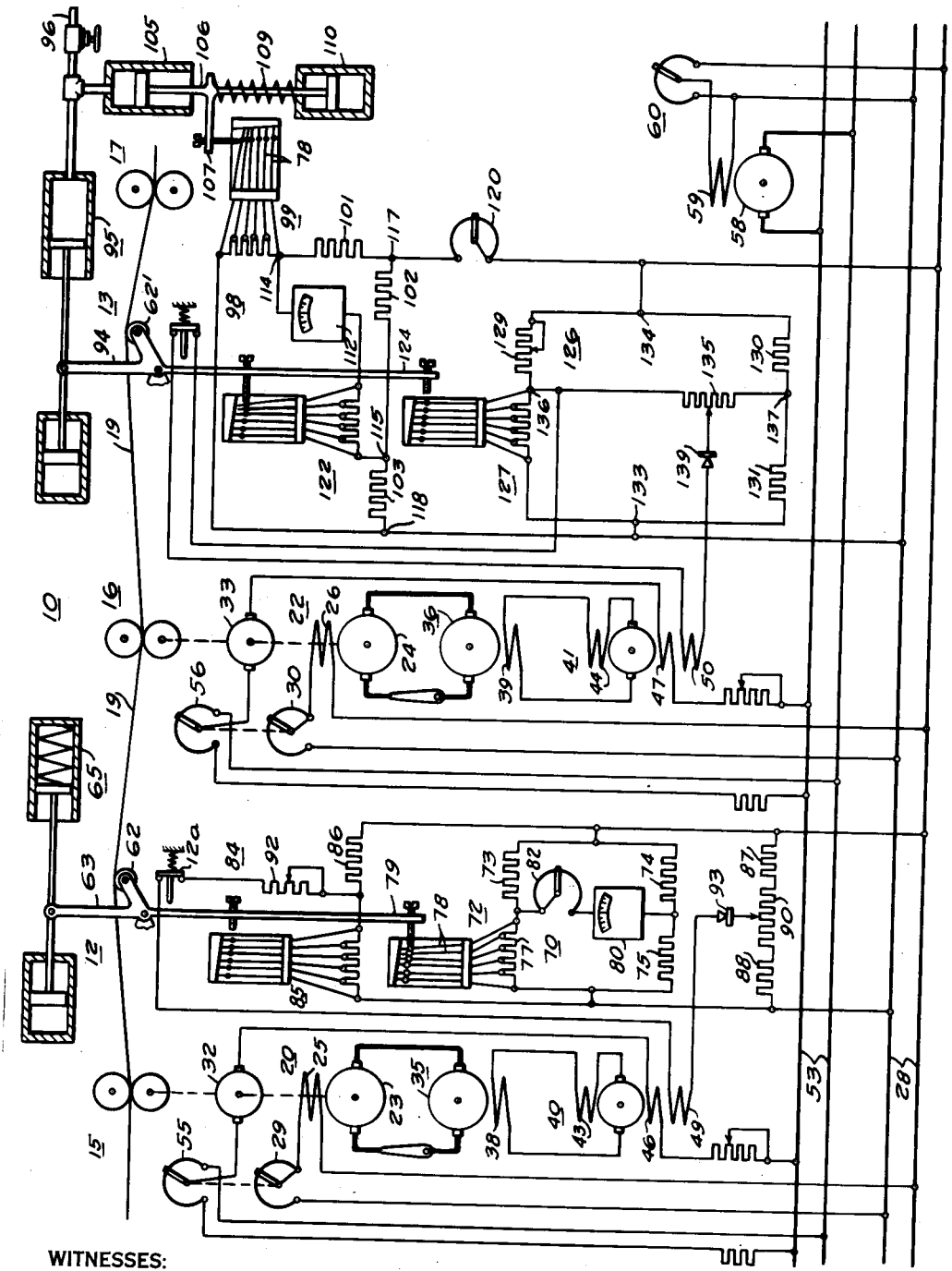
WITNESSES:
Ec.A. M⁻Closkey.
F.V. Siolma
INVENTORS
Basil J. Auburn and
Gerhard P. Lessmann.
BY
G.W. Crawford
ATTORNEY Patented Jan. 22, 1952

2,583,078

UNITED STATES PATENT OFFICE 2,583,078

TENSION RESPONSIVE CONTROL SYSTEM

Basil J. Auburn and Gerhard P. Lessmann, Pittsburgh, Pa., assignors to Westinghouse Electric Corporation, East Pittsburgh, Pa., a corporation of Pennsylvania Application April 13, 1948, Serial No. 20,684

7 Claims. (Cl. 318—7)

1

Our invention relates, generally, to control systems, and it has reference in particular to tension responsive control systems such as may be used with tandem strip mills or the like for indicating and/or controlling the tension of a strip of material between roll stands or other work devices.

Generally stated, it is an object of our invention to provide a tension responsive control system which is simple and inexpensive to manufacture, and reliable and effective in operation.

More specifically, it is an object of our invention to provide a tension responsive control system using a bridge circuit including a variable impedance device which is responsive to the operating position of a strip tension device, for controlling and/or indicating the tension of a strip of material.

One object of our invention is to provide, in a tension responsive control system, for readily calibrating the control system to compensate for different heights of pass line without having to change the physical location of the tension device with respect to the pass line.

Another object of our invention is to provide for calibrating a tension responsive control system of the character referred to by electrically adjusting an operating condition of the response circuit in the bridge circuit, the balance of which is responsive to the operating position of the tension device.

Yet another object of our invention is to provide for using a Wheatstone bridge circuit in conjunction with a tension device for indicating the tension of a strip of material, or for limiting the tension thereof to different predetermined values.

It is also an object of our invention to provide, in a tension responsive control system of the character described, for utilizing an indicating meter connected in the bridge circuit which includes variable resistance element responsive to the operating position of the tension device.

It is an important object of our invention to provide a tension indicating system wherein an indicating means is jointly responsive to the operating position of a fluid pressure actuated tension device and to the pressure at which the pressure fluid is supplied thereto.

We further propose to provide for limiting the tension of a strip of material by using a tension control field winding on a regulating generator, which winding may be connected in circuit relation with a rectifier device in a bridge circuit, the balance of which is controlled by a variable resistance device responsive to the strip tension.

2

A further object of our invention is to provide for using an adjustable balance bridge circuit responsive to the operating position of a tension device for indicating and/or limiting the tension of a strip of material.

Other objects will in part be obvious, and will in part be explained hereinafter.

In practicing our invention in one of its forms, a tension device in the form of a tensiometer having a tension roll mounted on a bell crank lever and biased against a strip of material by fluid pressure means, is used to deflect the strip from its normal pass line between adjacent roll stands and provide for producing a predetermined tension therein. The tension is measured by means of an electrical indicating meter which is connected in the response circuit of a Wheatstone bridge circuit having a variable resistance device in one leg thereof which is responsive to the pressure at which fluid is applied to the fluid pressure means. An additional variable resistance device responsive to the operating position of the tension roll is connected in series circuit relation with the meter in the bridging or response circuit, so that the meter operates to indicate the tension of the strip material. A rheostat is used to vary the voltage applied to the bridge circuit so as to calibrate the meter for different relative heights of the tension device and the pass line such as might be occasioned by using lower work rolls of different diameters.

For a more complete understanding of the nature and scope of our invention, reference may be made to the following detailed description, which may be studied in connection with the accompanying drawing, in which the single figure is a diagrammatic view of a tension responsive control system embodying the invention.

Referring to the drawing, the reference numeral 10 may denote, generally, a tension responsive control system wherein tension devices 12 and 13 may be positioned between adjacent roll stands 15, 16 and 17 of a tandem mill, which may be disposed to work upon a strip of material 19 in a well known manner.

The roll stands may be provided with suitable driving means, and for the purpose of simplification, driving means are shown only for the roll stands 15 and 16. The stands 15 and 16 may, for example, be provided with individual mill motor 20 and 22, comprising armatures 23 and 24, and field windings 25 and 26, which may be connected to a suitable source of control voltage represented by conductors 28, through field rheostats 29 and 30, respectively. Pilot generators 32 and 33 may be provided in connection with the motors 20 and 22 for producing control voltages proportional to the speeds of the motors and rolls.

The armatures 23 and 24 of the mill motors may be supplied with electrical energy from individual generators 35 and 36, having field windings 38 and 39, respectively. Energization of these field windings may be effected from regulating generators 40 and 41, which may be of the self-energizing type, comprising self-energizing field windings 43 and 44, speed control field windings 46 and 47, and tension control field windings 49 and 50, respectively.

The speeds of the mill motors 20 and 22 may be regulated to normally maintain the strip tension by energizing the speed control field windings 46 and 47 of the regulating generators in accordance with differential voltages produced by matching the voltages of the pilot generators 32 and 33 against voltages derived from a reference source. For example, the field windings 46 and 47 may be connected in series circuit relation with their respective pilot generators 32 and 33 across a speed reference bus comprising conductors 53. The pilot generators may be connected in opposition to the voltages derived from the conductors 53 through potentiometers 55 and 56, which may be operatively connected to the field rheostats 29 and 30, so as to utilize field control for varying the speeds of the mill motors.

The conductors 53 may be connected to a suitable reference source, such as control generator 58, having a field winding 59. The field winding 59 may be energized from the constant voltage control bus conductors 28 through a master rheostat 60, which may be utilized to vary the output voltage of the control generator, and hence vary the speeds of the mill motors 20 and 22, jointly.

The tension device 12 may comprise a tension roll 62 rotatably mounted on a bell crank lever 63 rotatably supported on suitable support means (not shown) and provided with spring actuating means 65 for biasing the roll 62 against the strip 19 to deflect it upwards from its normal pass line between the roll stands 15 and 16. In its free position the roll moves upwardly as the actuating means 65 moves the lever 63 to the left. The normal operating position of the roll 62 will be in a normal range somewhat below the free position and above the normal pass line as the tension in the strip reacts to force the roll downwardly to the position shown, for example.

In order to indicate the tension in the strip 19, indicating means 70 responsive to the operating position of the tension device may be provided. The indicating means 70 may comprise a normally balanced Wheatstone bridge circuit including, in the legs thereof, a variable resistance device 72 and fixed control resistors 73, 74, and 75. The bridge circuit may be energized from a suitable source such as the control conductors 28.

The variable resistance device 72 may be disposed to vary the balance of the circuit and may, for example, comprise a resistor 77 connected in one leg of the bridge circuit, and which may be provided with a plurality of relatively flexible contact members 78 connected thereto at spaced intervals, and disposed to shunt sections of the resistor. The contact members 78 may be disposed to be actuated by means of an arm 79 dependent from the bell crank lever 63 of the tension device 12. Since the tension of the strip of material 19 is proportional to the position of the roll 62 for a given pass line, an indicating device such as the electric meter 80 may be connected in the bridging or response circuit of the Wheatstone bridge circuit, which may be normally balanced under zero tension conditions, so as to be responsive to unbalance of the bridge circuit. Since the unbalance is dependent upon the impedance of the variable resistance device 72, it is responsive to the operating position of the tension device 12, and the tension of the strip 19. With the roll 62 in the operating position as shown, the arm 79 will be actuated to flex several of the contact members 78 into engagement with each other, thus producing an unbalance in the bridge circuit which is indicative of the strip tension.

Since the location of the tension roll 62 above the mill pass line determines the relation between the tension of the strip and the force applied by the roll, a rheostat 82 may be connected in series circuit relation with the meter 80 and calibrated to adjust the circuit for variations in the height of calibrating the meter to read the pounds tension in the strip 19 without having to adjust the actual diameters of lower work rolls.

In order to limit the tension of the strip 19 to a predetermined value, which may, for example, be a maximum permissible safe operating value, a tension limit circuit denoted generally by the numeral 84 may be provided for controlling the operation of the regulating generator 40. For example, a variable resistance device 85 similar to the resistance device 72 may be disposed for actuation by the operating member 79 of the tension device 12. The resistance device 85 may be connected in a Wheatstone bridge circuit with control resistors 86, 87 and 88. The tension control field winding 49 may be connected in the bridging or response circuit of the Whatstone bridge circuit by means of a potentiometer device 90 for adjusting the balance point of the circuit, and a control resistor 92 which may be utilized to vary the sensitivity of the circuit. The bridge circuit may be normally balanced, or it may, if desired, be normally unbalanced in one direction, and a rectifier device 93 may be connected in series circuit relation with the tension control winding 49 so as to prevent energization of the tension control field winding 49 except when the circuit is unbalanced in the opposite direction as a result of the resistance of the variable resistance device 85 reaching a value in response to operation of the tension device 12 to a predetermined position, which is indicative that the tension of the strip 19 has reached the predetermined maximum value. A limit switch 12a may be used to render the tension control winding 49 ineffective when the tension device 12 is in free or minimum tension position.

The tension device 13 may also comprise a tension roll 62', which may be rotatably mounted on a bell crank lever 94 for deflecting the strip of material 19 above its normal pass line between the roll stands 16 and 17. The bell crank lever 94 may be actuated by fluid pressure means 95, which may be supplied with fluid pressure through a conduit 96.

In order to provide for indicating the tension of the strip of material 19 between the roll stands 16 and 17, a tension indicating circuit, denoted generally by the numeral 98, may be provided. The tension indicating circuit 98 may comprise a normally balanced Wheatstone bridge circuit including in the legs thereof a variable resistance device 99 similar to the variable resistance devices 72 and 85, and fixed control resistors 101, 102 and 103. The variable resistance device 99 may be responsive to the pressure of the fluid supplied to the fluid pressure actuating means 95 so as to produce a variable unbalance voltage across the bridge circuit in accordance with the fluid pressure applied to the pressure means 95. For example, pressure responsive means 105 may be provided, comprising a pressure actuated member 106 having an arm 107 for actuating the contact members 78 of the variable resistance device 99. Means such as a spring 109 may be provided for opposing the operating force of the fluid pressure, and damping means 110 of a type well known in the art may be connected to the pressure actuated member 106 for stabilizing the operation thereof.

An indicating meter 112 may be connected in the bridging or response circuit of the Wheatstone bridge circuit between diametrically opposite terminal points 114 and 115. The other diametrically opposite terminal points 117 and 118 of the bridge circuit may be connected to the control bus conductors 28 through a rheostat 20, which may be utilized to vary the voltage applied to the bridge circuit and compensate for different diameters of work rolls used in the roll stands 16, 17, which vary the effective height of the tension roll above the pass line. In order to utilize the meter 112 for indicating the tension of the strip of material 19, an additional variable resistance device 122 similar to the variable resistance device 72 may be connected in series circuit relation with the meter in the bridging circuit to calibrate the meter in accordance with the operating position of the tension roll. The variable resistance device 122 may be actuated by an arm 124 which may depend from the bell crank lever 94 of the tension device 13.

In order to limit the tension of the strip of material 19 between the roll stands 16 and 17, a tension limit circuit 126 may be provided for controlling the energization of the tension control field winding 50 of the regulating generator 41. The tension limit circuit may, for example, comprise a bridge circuit wherein a variable resistance device 127 responsive to movement of the arm 124 may be connected in one leg of a Wheatstone bridge circuit with an adjustable tension limit rheostat 129 and fixed control resistors 130 and 131 in the other legs. Diametrically opposite terminal points 133 and 134 of the bridge circuit may be connected to the control conductors 28. A potentiometer device 135 may be connected in the bridging or response circuit between terminal points 136 and 137. The tension control field winding 50 may be connected across a portion of the potentiometer 135 in series circuit relation with a rectifier device 139, which functions to prevent energization of the field winding 50 unless the tension of the strip material 19 exceeds a predetermined maximum value.

In operation, the spring pressures means 65 biases the bell crank lever 63 so as to force the tension roll 62 upwardly against the strip of material 19 thereby deflecting the strip from its normal pass line between the roll stands 15 and 16. The tension roll will, accordingly, move up and down from an intermediate position in the normal operating range, in which it is shown, as the tension of the strip varies. As the operating position of the tension roll 62 varies downwardly, for example, from the position shown, the arm 79 progressively actuates more and more of the flexible contact members 78, and progressively reduces the resistance of the resistor 77. This increases the unbalance of the Wheatstone bridge circuit, whereby the unbalance voltage across the indicating meter 80 in the responsive circuit is increased and indicates increased strip tension. By adjusting the rheostat 82, the meter 80 may be calibrated to read the pounds tension produced in the strip 19 for any given operating position of the tension roll 62 relative to the pass line. When lower work rolls of a different diameter are used, it is only necessary to adjust the rheostat 82 to correct the tension reading. It is not necessary to adjust the operating level of the tension roll with jacks and the like, as is commonly done in the art.

Should the tension of the strip exceed a predetermined value, an unbalance will be produced in the tension limit circuit 84, which results in a current through the tension control winding 49. This current will be of such a value and in such a direction as to make the magnetomotive force of the tension control field winding 49 cumulative with respect to the magnetomotive force of the speed control field winding 46 resulting from the speed reference voltage derived from the conductors 53. Accordingly, the regulating generator 40 will increase the output voltage of the main generator 35, so as to increase the speed of the mill motor 20, until the voltage of the pilot generator 32 increases sufficiently to reduce the net excitation of the field winding 46 to restore the balance of the regulating generator 40. The increased speed of the mill motor 20 provides a greater length of the strip of material between the stands and reduces the strip tension.

The operation of the tension limit circuit 126 is substantially identical with that of the tension limit circuit 84, except in that the tension control field winding 50 of the regulating generator 41 is connected in shunt circuit relation with a portion of the potentiometer device 135 instead of being connected directly across the bridge circuit. The output voltage of the regulating generator 41 will be varied in a manner substantially identical with that of the regulating generator 40, whenever the operating arm 124 moves to a position in which the tension of the strip material 19 reaches the predetermined maximum value. The response of the regulating generator 41 may be varied by adjusting the setting of the potentiometer device 135, and varying the energization level of the winding 50. The value of tension at which the tension control field winding 50 becomes effective may be varied by varying the adjustment of the control resistor 129 and thus changing the balance of the bridge circuit 126.

In operation, the variable resistance device 99 varies the balance of the tension indicating bridge circuit 98 in accordance with the fluid pressure applied to the actuating means 95. This varies the voltage unbalance and compensates the indicating circuit for changes in the fluid pressure which will cause the tension device 13 to occupy a particular operating position for a given strip tension. As the operating position of the tension roll 62' varies, the resistance of the variable resistance device 122 connected in series circuit relation with the indicating meter 112 varies so as to change the calibration of the meter 112 in accordance with the elevation of the tension roll above the pass line. The rheostat 120 varies the voltage applied to the bridge circuit so as to permit recalibrating the meter for different diameters of lower rolls, which vary the height of the pass line.

From the above description and the accompanying drawing, it will be apparent that we have provided in a simple and effective manner for calibrating tensiometer devices. Since the tension of a strip of material is directly proportional to the operating force of the tension device, and inversely proportional to the height of the tensiometer roll above the pass line, we have provided an accurate and readily adjustable tension response system for indicating and controlling the tension of a strip of material. In accordance with the embodiments of our invention, the tension device may be permanently mounted, and the usual height adjusting jacks eliminated, since the bridge circuit may be compensated for variations in the pass line due to different diameter work rolls.

Since certain changes may be made in the above-described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A control system for use with a tension device disposed to move to different operating positions to deflect a strip of material from a normal pass line between adjacent mill stands having electric driving motors comprising; a variable resistance device actuated in response to movement of the tension device; a regulating generator having a control winding, said regulating generator being connected to regulate the operation of one of the motors; and a bridge circuit including said variable resistance element and having a response circuit disposed to be subjected to a reversible voltage including the regulating generator control winding, a rectifier device connected to prevent energization of the control winding except when the tension of the strip exceeds a predetermined value, and a potentiometer device disposed to vary the point of connection of the response circuit between adjacent legs of the bridge circuit for varying the operating position at which the energization of the control winding commences.

2. In a control system for a regulating generator controlling the operation of a mill stand motor in a strip mill, a tension device operable to deflect a strip of material a predetermined amount from a normal pass line, variable resistance means responsive to the position of the tension device, a regulating generator having field excitation means connected for controlling the operation of the mill stand motor, circuit means connecting the field excitation means and the variable resistance means in a Wheatstone bridge circuit with the variable resistance means in one leg of the bridge circuit and the field excitation means in the bridging circuit, and rectifier means connected in circuit relation with the field excitation means said bridging circuit being connected at one end to the bridge circuit through a potentiometer device, and the rectifier means being so connected as to prevent energization of the field excitation means until the tension device operates a predetermined amount, whereupon the regulating generator becomes effective to control operation of the mill stand motor to reduce the tension of the strip of material.

3. A tension limiting system for use with a tension device operable to different positions to deflect a strip of material from a normal pass line between roll stands having driving motors connected in driving relation therewith comprising, a regulating generator having a tension control field winding, circuit means connecting the regulating generator to control one of the motors, variable resistance means responsive to operation of the tension device, adjustable resistance means, circuit means connecting the variable and adjustable resistance means in a bridge circuit, circuit means including a voltage divider connecting the tension control field winding in bridging relation across the bridge circuit so as to vary the point of balance of the bridge circuit relative to the operating position of the tension device, and rectifier means so connected in circuit relation with the tension control field winding as to permit energization of the control field winding in a direction to effect a reduction in the tension of the strip.

4. In a control system for use with a tension device having fluid pressure means for actuating a tension roll to different positions to deflect a strip of material from a normal pass line, a variable resistance element responsive to different operating positions of the tension roll, an additional variable resistance device responsive to the fluid pressure applied to the fluid pressure means, circuit means connecting the additional variable resistance element in a balanceable bridge circuit, an indicating meter, and additional circuit means including the first-mentioned variable resistance device connecting the indicating meter across the bridge circuit in a response circuit responsive to unbalance of the bridge circuit.

5. In a tension responsive system for use with a tension device operable to deflect a strip of material from a normal pass line between work rolls of adjacent roll stands, a variable resistance device responsive to the operating position of the tension device, a bridge circuit including said variable resistance device and a response circuit including a meter responsive to unbalance of bridge circuit to indicate the operating position of the tension device, and additional circuit means connected to apply a control voltage to the bridge circuit including adjustable resistor means operable to vary the applied voltage to compensate the meter for changes in the diameter of the lower work rolls which varies the pass line relative to the tension device.

6. A control system for use with a tension device operable to different positions to normally deflect a strip of material from a normal pass line to a predetermined operating position comprising, a variable resistance element responsive to the operating position of the tension device, a plurality of fixed resistance elements connected in a Wheatstone electrical bridge circuit with the variable impedance element, said bridge circuit having two pairs of diagonally opposite points, circuit means connecting one pair of diametrically opposite points of the circuit to a source of substantially constant control voltage, control means operable to reduce the tension in the strip and restore the tension device to said operating position, and circuit means including a rectifier device and a voltage divider connecting said control means in a response circuit between the other diagonally opposite pair of points of the bridge circuit.

7. A control system for use with a tension device operable to different positions to deflect a strip of material from a normal pass line between two work devices operable in relatively variable speed relation comprising, variable impedance means responsive to predetermined movement of the tension device, a balanceable electrical circuit including the variable impedance means, a regulating generator having a control field winding, and a response circuit associated with the balanceable circuit including a rectifier device and the control field winding connected in series circuit relation, said response circuit being energizable in one direction only so as to be responsive to unbalance of the balanceable circuit in one direction only to effect operation of the regulating generator to vary the speed of one of the work devices and reduce the tension of the strip of material.

BASIL J. AUBURN.
GERHARD P. LESSMANN.

REFERENCES CITED

The following references are of record in the file of this patent:

UNITED STATES PATENTS

| Number | Name | Date |
|---|---|---|
| 2,152,556 | Messinger | Mar. 28, 1939 |
| 2,231,702 | Burgwin et al. | Feb. 11, 1941 |
| 2,284,364 | Breazeale | May 26, 1942 |
| 2,285,654 | Hanna et al. | June 9, 1942 |
| 2,287,283 | Weber | June 23, 1942 |
| 2,325,381 | Edwards et al. | July 27, 1943 |
| 2,343,229 | Stone et al. | Feb. 29, 1944 |
| 2,353,249 | Lebourg | July 11, 1944 |
| 2,389,382 | Mikina | Nov. 20, 1945 |
| 2,454,232 | Stoltz | Nov. 16, 1948 |